(12) United States Patent
Dudar et al.

(10) Patent No.: US 11,326,558 B2
(45) Date of Patent: *May 10, 2022

(54) EVAPORATIVE EMISSIONS DETECTION METHOD WITH VEHICLE SELF LEVELING SUSPENSION COMPENSATION

(71) Applicant: Ford Global Technologies, LLC, Dearborn, MI (US)

(72) Inventors: Aed M. Dudar, Canton, MI (US); Scott A. Bohr, Novi, MI (US); Matthew Werner, Kenockee Township, MI (US); Michael William Soltis, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 549 days.

This patent is subject to a terminal disclaimer.

(21) Appl. No.: 16/294,697

(22) Filed: Mar. 6, 2019

(65) Prior Publication Data

US 2019/0203668 A1 Jul. 4, 2019

Related U.S. Application Data

(62) Division of application No. 14/933,611, filed on Nov. 5, 2015, now Pat. No. 10,253,728.

(51) Int. Cl.
*F02M 25/08* (2006.01)
*B60K 15/06* (2006.01)
*B60G 17/017* (2006.01)
*B60G 17/0195* (2006.01)
*G07C 5/08* (2006.01)
(Continued)

(52) U.S. Cl.
CPC ....... *F02M 25/0809* (2013.01); *B60G 17/017* (2013.01); *B60G 17/0195* (2013.01); *B60K 15/03504* (2013.01); *B60K 15/061* (2013.01); *G07C 5/0808* (2013.01); *B60G 2400/61* (2013.01); *B60G 2500/30* (2013.01); *B60G 2600/182* (2013.01); *B60G 2800/912* (2013.01);
(Continued)

(58) Field of Classification Search
CPC .............. F02M 25/0809; B60G 17/017; B60G 17/0195; B60K 15/03504; B60K 15/061; G07C 5/0808
USPC ........................................................ 701/37
See application file for complete search history.

(56) References Cited

U.S. PATENT DOCUMENTS 3,173,469 A 3/1965 Shockey
4,396,202 A 8/1983 Kami et al.
(Continued)

*Primary Examiner* — Isaac G Smith
(74) *Attorney, Agent, or Firm* — Geoffrey Brumbaugh; McCoy Russell LLP

(57) ABSTRACT

Methods and systems are provided for conducting an evaporative emissions test on a fuel system and an emissions control system in a vehicle. In one example, in response to an indication that a vehicle parking condition may result in the isolation of the fuel system from the emissions control system via the unintentional closing of fuel tank valves, a vehicle's active suspension system may be employed in order to level the vehicle a determined amount such that the fuel system isolation issues may be mitigated prior to an evaporative emissions test procedure. In this way, the entire fuel system and emissions control system may be diagnosed for potential undesired emissions, and potential violations of regulatory requirements for evaporative emissions testing may be reduced.

9 Claims, 5 Drawing Sheets

(51) Int. Cl.
  *B60K 15/035* (2006.01)
  *B60K 15/03* (2006.01)
(52) U.S. Cl.
  CPC ............... *B60K 2015/0319* (2013.01); *B60K 2015/062* (2013.01)

(56) References Cited

U.S. PATENT DOCUMENTS

| | | | | |
|---|---|---|---|---|
| 4,629,043 | A | | 12/1986 | Matsuo et al. |
| 4,923,210 | A | | 5/1990 | Heider et al. |
| 5,322,321 | A | | 6/1994 | Yopp |
| 5,589,629 | A | * | 12/1996 | Quinn ................ G01M 15/108 73/118.01 |
| 5,750,888 | A | | 5/1998 | Matsumoto et al. |
| 5,964,812 | A | | 10/1999 | Schumacher et al. |
| 6,330,878 | B1 | * | 12/2001 | Perry ................. F02M 25/0836 123/519 |
| 6,401,528 | B1 | * | 6/2002 | Lambert ............ F02M 25/0809 73/114.39 |
| 6,615,656 | B1 | * | 9/2003 | Breed ...................... B60J 10/00 177/136 |
| 7,231,933 | B2 | | 6/2007 | Kim |
| 8,447,495 | B2 | * | 5/2013 | Pearce .................... F02D 29/02 701/103 |
| 8,868,305 | B2 | | 10/2014 | Jang et al. |
| 2007/0233328 | A1 | * | 10/2007 | Ikeda ................. B60R 16/0231 701/1 |
| 2009/0259419 | A1 | * | 10/2009 | Kasai ................. G01R 31/392 702/63 |
| 2014/0069394 | A1 | | 3/2014 | Jentz et al. |

* cited by examiner

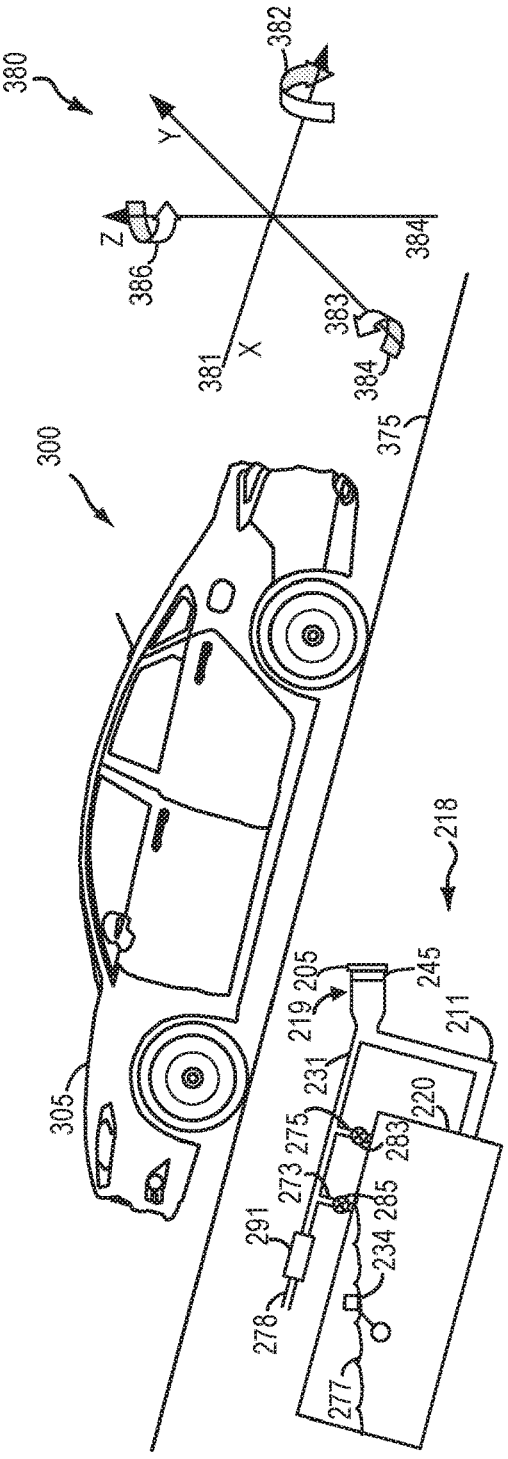
FIG. 3A
FIG. 3B
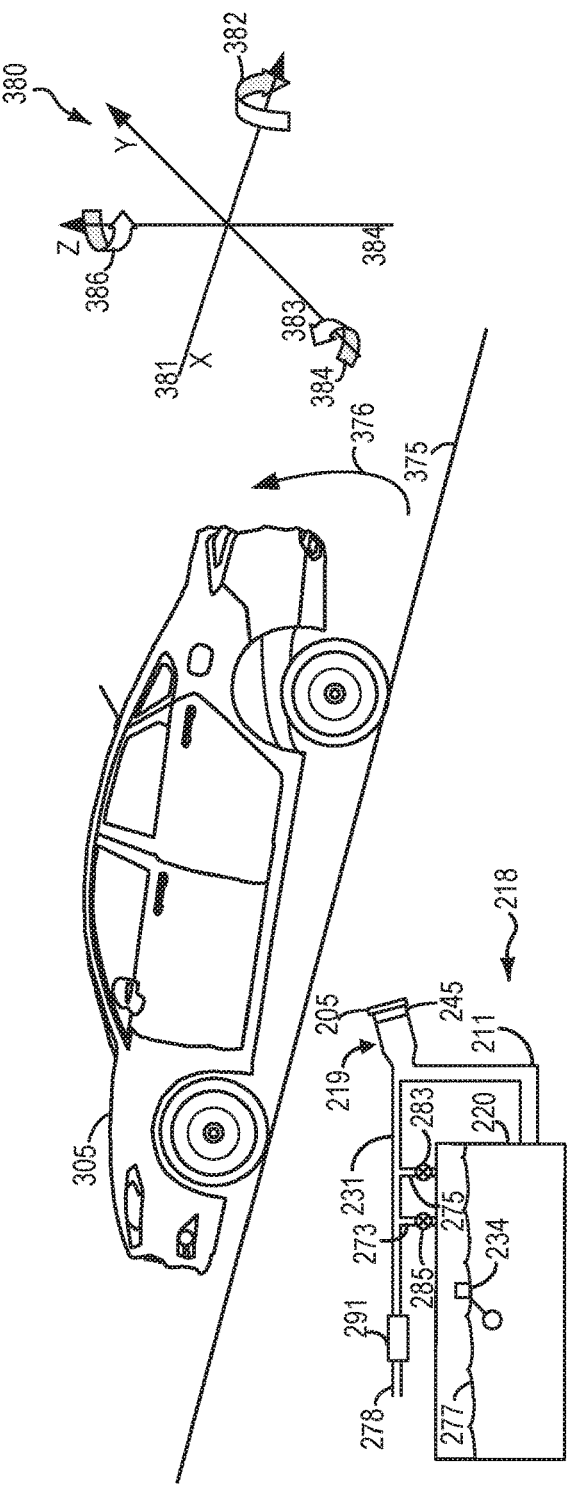
FIG. 3C
FIG. 3D

EVAPORATIVE EMISSIONS DETECTION METHOD WITH VEHICLE SELF LEVELING SUSPENSION COMPENSATION

CROSS REFERENCE TO RELATED APPLICATION

The present application is a divisional of U.S. patent application Ser. No. 14/933,611, entitled "EVAPORATIVE EMISSIONS DETECTION METHOD WITH VEHICLE SELF LEVELING SUSPENSION COMPENSATION," and filed on Nov. 5, 2015. The entire contents of the above-referenced application are hereby incorporated by reference for all purposes.

FIELD

The present description relates generally to methods and systems for controlling a vehicle to level a fuel tank prior to conducting an evaporative emissions test.

BACKGROUND/SUMMARY

Vehicle emission control systems may be configured to store fuel vapors from fuel tank refueling and diurnal engine operations, and then purge the stored vapors during a subsequent engine operation. In an effort to meet stringent federal emissions regulations, emission control systems may be intermittently diagnosed for the presence of undesired emissions that could release fuel vapors to the atmosphere. Undesired evaporative emissions may be identified using engine-off natural vacuum (EONV) during conditions when a vehicle engine is not operating. In particular, a fuel system and/or an emissions control system may be isolated at an engine-off event. The pressure in such a fuel system and/or an emissions control system will increase if the tank is heated further (e.g., from hot exhaust or a hot parking surface) as liquid fuel vaporizes. As a fuel tank cools down, a vacuum is generated therein as fuel vapors condense to liquid fuel. Vacuum generation is monitored and undesired emissions identified based on expected vacuum development or expected rates of vacuum development. However, the entry conditions and thresholds for a typical EONV test may be based on an inferred total amount of heat rejected into the fuel tank during the prior drive cycle. The inferred amount of heat may be based on engine run-time, integrated mass air flow, miles driven, etc. If these conditions are not met, the entry into the evaporative emissions test is aborted. Thus, hybrid electric vehicles, including plug-in hybrid electric vehicles (HEV's or PHEV's), pose a problem for effectively controlling evaporative emissions. For example, primary power in a hybrid vehicle may be provided by the electric motor, resulting in an operating profile in which the engine is run only for short periods. As such, adequate heat rejection to the fuel tank may not be available for EONV diagnostics.

An alternative to relying on inferred sufficient heat rejection for entry into an EONV diagnostic test is to instead actively pressurize or evacuate the fuel system and/or emissions control system via an external source. For example, a method may perform a pressure-based evaporative emissions test using a pump to pressurize and/or evacuate the fuel system and/or emissions control system. The fuel system and/or evaporative emissions control system may then be monitored for a selected time period, and if the pressure falls below a threshold value if initially pressurized, or rises above a threshold value if initially evacuated, the system identifies undesired emissions. As such, by conducting evaporative emissions tests via the use of an external pressure source, reliance on heat rejected from the engine may be circumvented.

Whether relying on EONV or actively pressurizing or evacuating the fuel system and evaporative emissions control system, the entire fuel system and evaporative emissions control system must be diagnosed for potential undesired emissions. This includes the cap or capless area and the entire vapor space of the fuel tank. However, certain parking conditions may prevent the testing of the entire fuel system and/or evaporative emissions control system for undesired emissions. For example, when parking on steep slopes, liquid fuel can shut closed certain passive fuel tank valves thus restricting communication between the fuel tank and the rest of the evaporative emissions control system. Other potential problems resulting from parking on grades may include the formation of an isolated vapor dome space that is not in communication with the rest of the fuel system and evaporative emissions control system. For example, due to packaging constraints, fuel tank geometries may have many cavities wherein some areas may be higher than others, such that when parking on an incline isolated vapor dome spaces may result. Any areas of the fuel system and/or evaporative emissions control system that go unchecked as a result of parking on an incline violates regulatory requirements for evaporative emissions testing.

The fact that liquid fuel may result in isolated vapor spaces and a restriction of communication between the fuel tank and the rest of the fuel system and evaporative emissions control system when the vehicle is inclined has been described. For example, US Patent No. US 20140069394 teaches conducting an engine-on evaporative emissions test, and responsive to an unintended closing of a fuel tank vent valve, for example due to vehicle travel along an incline that is higher than a threshold grade, discontinuing the evaporative emissions test and resuming the test at a later time. However, the inventors herein have recognized potential issues with such a method. For example, the method does not teach mitigating action for an engine-off evaporative emissions test where communication between the fuel tank and the rest of the fuel system and evaporative emissions control system is restricted and/or one or more isolated vapor dome space(s) is created due to the vehicle being parked on a steep slope.

Thus, the inventors herein have developed systems and methods to at least partially address the above issues. In one example, a method is provided comprising, responsive to a first vehicle-off condition, maintaining a vehicle compound angle with respect to ground and conducting an evaporative emissions test, and responsive to a second vehicle-off condition, leveling the vehicle a determined amount and then conducting the evaporative emissions test.

As one example, responsive to the vehicle-off condition, a fuel level and a vehicle compound angle are indicated, wherein indicating the vehicle compound includes indicating a vehicle pitch angle and a vehicle bank (roll) angle. Based on the fuel level and vehicle compound angle, it may be determined whether the fuel level and vehicle compound angle is above a predetermined threshold, thus resulting in fuel in the fuel tank causing the closing of one or more fuel tank vent valves, and/or causing the formation of an isolated fuel tank vapor dome(s) resulting from one or more section(s) of the fuel tank being isolated from any other section(s) of the fuel tank. In other words, it may be determined whether the fuel level and vehicle compound angle is causing fuel system isolation issues that may impact the results of an evaporative emissions test. Determining whether the combined fuel level and vehicle parking condition is above a predetermined threshold may be based on computer aided design modeling of the fuel tank. As such, in the first condition, it may be determined that the fuel level and vehicle compound angle is below a threshold, thus an evaporative emissions test procedure may be conducted without prior leveling of the vehicle. Alternatively, in the second condition, it may be determined that the fuel level and vehicle compound angle is above a threshold, thus the vehicle may be leveled prior to conducting the evaporative emissions test procedure.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3A schematically illustrates a vehicle on an indicated grade, and depicts on-board vehicle sensors configured to detect such an indicated grade.

FIG. 3B schematically shows a fuel tank of a vehicle on the grade indicated in FIG. 3A.

FIG. 3C schematically illustrates a vehicle on an indicated grade, wherein the vehicle has been leveled a determined amount based on on-board vehicle sensors and fuel tank fuel level.

FIG. 3D schematically shows a fuel tank of a vehicle on the grade indicated in FIG. 3C, subsequent to the vehicle being leveled a determined amount.

DETAILED DESCRIPTION

Figure 4:
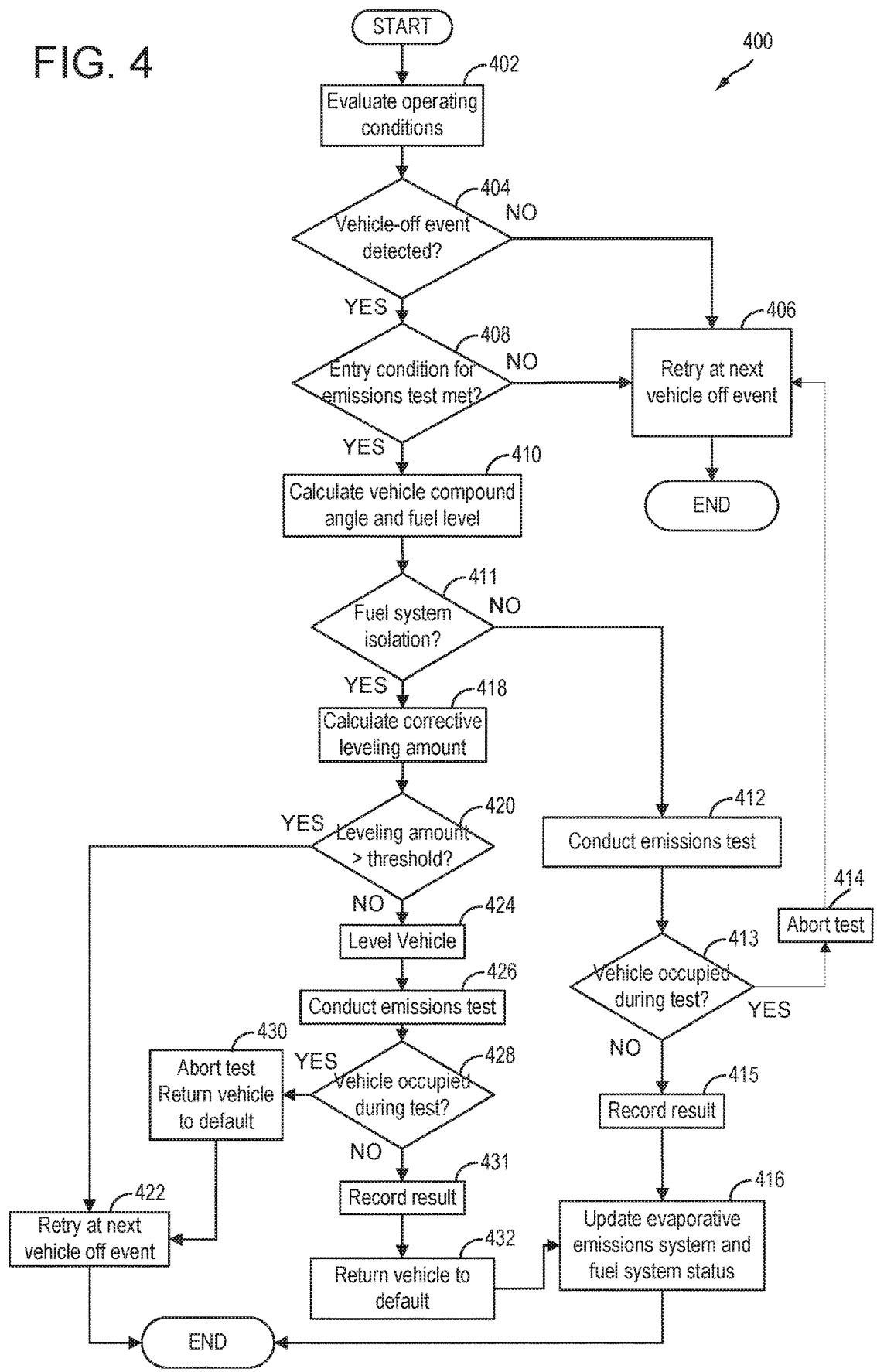
FIG. 4 shows an example method for leveling a vehicle a determined amount prior to conducting an evaporative emissions test procedure.
Figure 5:
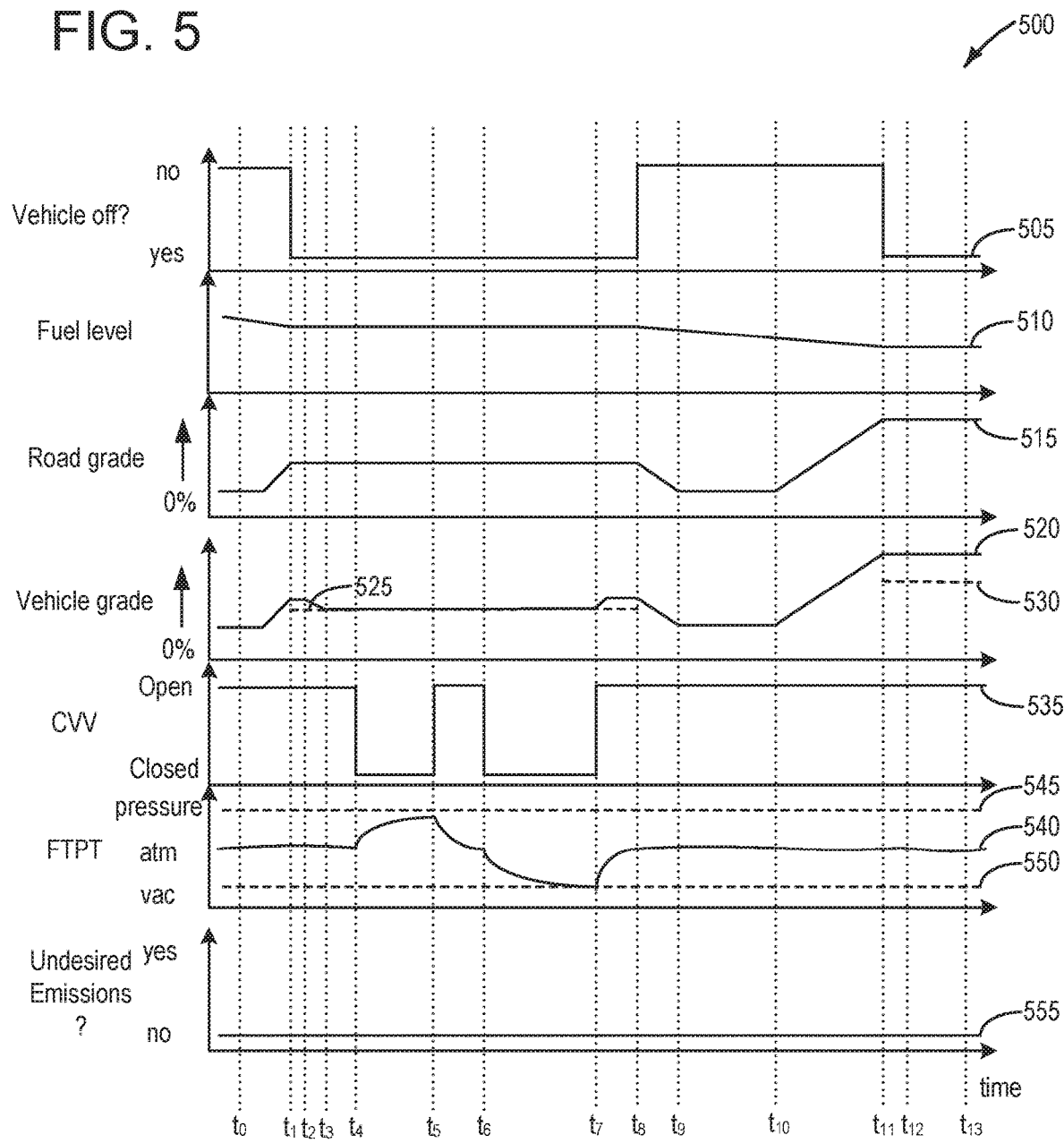
FIG. 5 shows a timeline for an example vehicle leveling procedure prior to conducting an evaporative emissions test procedure.

The following detailed description relates to systems and methods for performing an evaporative emissions test on a fuel system and emissions control system. Specifically, the description relates to indicating whether a vehicle parking condition may result in the isolation of a fuel system from an emission control system via the unintentional shutting of fuel tank valves, and/or the formation of isolated vapor dome(s) within the fuel tank. The vehicle parking condition may include conditions such as a vehicle is parked on a steep hill, and may be further based on the level of fuel in the fuel tank under the indicated vehicle parking condition. Responsive to an indication that a vehicle parking condition may result in the isolation of the fuel system from the emission control system and/or the formation of isolated fuel tank vapor dome(s), the vehicle may be leveled a determined amount by the vehicle's active suspension system, such that the fuel system isolation may be mitigated prior to conducting an evaporative emissions test procedure. As such, areas of the fuel system that may otherwise go unchecked as a result of certain vehicle parking conditions, may instead be checked thus enabling regulatory requirements for evaporative emissions testing to be met. The systems and methods described herein may be applied to a vehicle system comprising an active suspension system, such as the vehicle system depicted in FIG. 1. In one example, the evaporative emissions test procedure may be conducted on a fuel system and an emissions control system, where the fuel system is coupled to the emissions control, an engine, and an exhaust system as depicted in FIG. 2. A vehicle parked on a grade may be indicated by on-board sensors, wherein a vehicle compound angle may be calculated, as depicted in FIG. 3A. Further, a vehicle parked on a grade may unintentionally close fuel tank vent valves, depending on the fuel level in the tank and the vehicle compound angle, as illustrated in FIG. 3B. Based on the level of fuel in the tank and the vehicle compound angle as indicated by on-board sensors, a corrective leveling amount of the vehicle may be determined, and the vehicle may be leveled a determined amount by the vehicle's active suspension system, as depicted in FIG. 3C. By leveling the vehicle a determined amount, fuel system isolation and the formation of isolated fuel tank vapor dome(s) may be mitigated, as illustrated in FIG. 3D. A method for detecting and mitigating potential fuel system isolation and or the formation of isolated fuel tank vapor dome(s) by actively leveling the vehicle using the vehicle's active suspension system is depicted in FIG. 4. A timeline for actively leveling a vehicle prior to conducting an evaporative emissions test procedure using the method of FIG. 4 is shown in FIG. 5.

Figure 1:
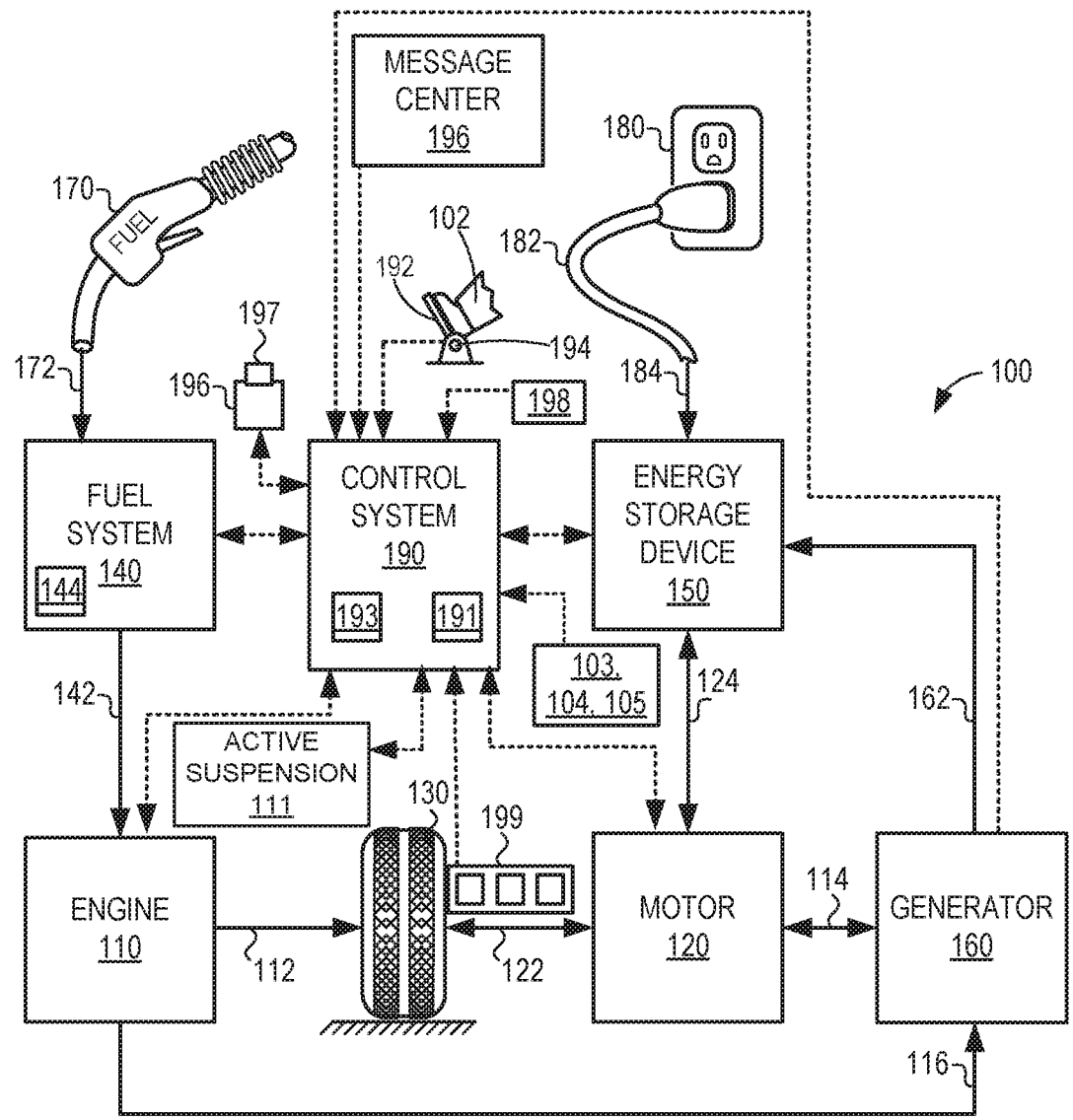
FIG. 1 schematically shows an example vehicle propulsion system.
Figure 2:
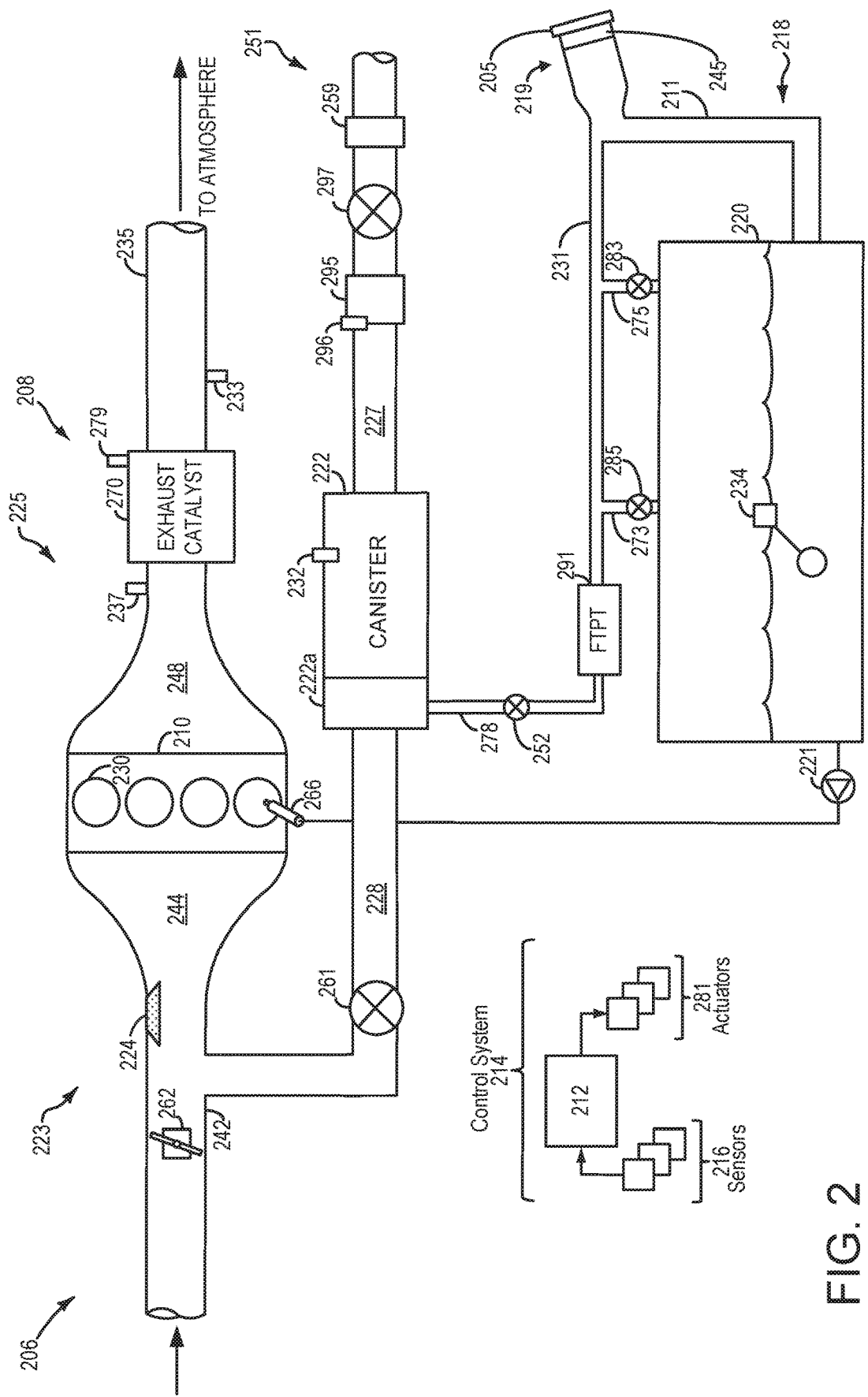
FIG. 2 schematically shows an example vehicle system with a fuel system and an evaporative emissions system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, a fuel tank in the vehicle may be depressurized so that refueling may be performed.

The vehicle propulsion system 100 may also include an ambient temperature/humidity sensor 198, and sensors dedicated to indicating the occupancy-state of the vehicle, for example seat load cells 103, door sensing technology 104, and onboard cameras 105. Vehicle propulsion system 100 may also include inertial sensors 199. Inertial sensors 199 may comprise one or more of the following: longitudinal, latitudinal, vertical, yaw, roll, and pitch sensors. As one example, inertial sensors 199 may couple to a vehicle's restraint control module (RCM) 191, the RCM 191 comprising a subsystem of control system 190. The control system may adjust engine output and/or the wheel brakes to increase vehicle stability in response to sensor(s) 199. In another example, the control system may adjust an active suspension system 111 responsive to input from inertial sensors 199. More specifically, active suspension system 111 may be connected to any variety of sensors, devices, components, modules, and other input sources located throughout the vehicle. These may include but are not limited to inertial sensors 199, suspension control modules 193, restraint control modules 192, cruise control modules, brake modules, fuel management systems, vision systems, navigation systems, telematics units, as well as any other suitable input source that can provide pertinent information to active suspension system 111. It should be appreciated that the various input sources can be embodied in software or hardware, they can be stand-alone devices or they can be integrated into other devices such as vehicle electronic modules, and they can be directly connected to active suspension system 111 or they can be connected via a communications bus or the like, to cite a few possibilities.

Furthermore, active suspension system 111 may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. Active suspension system iii may be used with tractor trailers, commercial and non-commercial trucks, recreational vehicles (RVs), sports utility vehicles (SUVs), cross-over vehicles, passenger cars, as well as any other motorized vehicle.

As will be described in further detail below, in one example, active suspension system 111 may be employed in order to level a vehicle a determined amount responsive to the vehicle being parked at such an angle that fuel in the fuel tank results in a closing of fuel tank valves (FIG. 2) and/or results in one or more section(s) of the fuel tank being isolated from any other section of the fuel tank (e.g. results in the formation of isolated vapor dome(s)).

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more exhaust catalyst 270, which may be mounted in a close-coupled position in the exhaust. Exhaust catalyst may include a temperature sensor 279. In some examples one or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the intake manifold of engine 210 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 210 is shut down.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 273 and 275.

Further, in some examples, one or more fuel tank vent valves in conduits 273 and/or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations, "running loss" (that is, fuel vaporized during vehicle operation), and diurnal cycles. In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve (CVV) 297 coupled within vent line 227. The canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291 (fuel tank pressure transducer), and canister temperature sensor 232. Other sensors such as pressure, temperature, air/fuel ratio, and composition sensors may be coupled to various locations in the vehicle system 206. As another example, the actuators may include fuel injector 266, throttle 262, fuel tank isolation valve 252, CVV 297, CPV 261 and refueling lock 245. The controller 212 may receive input data from the various sensors, process the input data, and trigger the actuators in response to the processed input data based on instruction or code programmed therein corresponding to one or more routines. An example control routine is described herein with regard to FIG. 4.

Evaporative emissions detection routines may be intermittently performed by controller 212 on fuel system 218 and emissions control system 251 to confirm that the fuel system and/or emissions control system is not degraded. As such, evaporative emissions detection routines may be performed while the engine is off (engine-off evaporative emissions test) using engine-off natural vacuum (EONV) generated due to a change in temperature and pressure at the fuel tank following engine shutdown and/or with vacuum supplemented from a vacuum pump. Alternatively, evaporative emissions detection routines may be performed while the engine is running by operating a vacuum pump and/or using engine intake manifold vacuum. Evaporative emissions tests may be performed by an evaporative level check monitor (ELCM) 295 communicatively coupled to controller 212. ELCM 295 may be coupled in vent 227, between canister 222 and the atmosphere. ELCM 295 may include a vacuum pump for applying negative pressure to the fuel system and/or emissions control system when administering an evaporative emissions test. In some embodiments, the vacuum pump may be configured to be reversible. In other words, the vacuum pump may be configured to apply either a negative pressure or a positive pressure on the fuel system and/or emissions control system. ELCM 295 may further include a reference orifice and a pressure sensor 296. Following the applying of vacuum to the fuel system and/or emissions control system, a change in pressure at the reference orifice (e.g., an absolute change or a rate of change) may be monitored and compared to a threshold. Based on the comparison, a fuel system and/or emissions control system may be diagnosed for undesired evaporative emissions.

In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be a default open valve that is closed upon actuation of the canister vent solenoid. In some examples, CVV 297 may be configured as a latchable solenoid valve. In other words, when the valve is placed in a closed configuration, it latches closed without requiring additional current or voltage. For example, during the conducting of a diagnostic evaporative emissions detection routine, CVV 297 may be placed in a closed configuration to isolate emissions control system 251 from atmosphere, with CPV 261 maintained closed. In another example, closing CVV 297 and opening isolation valve 252 during a diagnostic evaporative emissions detection routine may couple the fuel system 218 and emissions control system 251, wherein the coupled fuel system 218 and emissions control system 251 are isolated from atmosphere, with CPV 261 maintained closed.

As described above, in conducting diagnostic evaporative emissions routines, the entire emissions control system 251 and fuel system 218 must be diagnosed for potential undesired emissions. However, for evaporative emissions routines that take place while the vehicle is not in operation, but rather is in park, certain parking conditions may result in the closing of fuel tank valves, for example FLVV 285, and GVV 283, depending on the level of fuel in the tank and the vehicle compound angle. The closing of FLVV 285 and GVV 283 may thus restrict communication between fuel system 218 and emissions control system 251, wherein the fuel tank/fuel system may not be properly checked for undesired emissions during the test diagnostic. In another example, the formation of an isolated vapor dome space(s) may occur as a result of certain parking conditions depending on the fuel tank geometry and the level of fuel in the tank. As any areas of the emissions control system 251 and fuel system 218 that go unchecked violate regulatory requirements for evaporative emissions testing, it is desirable to mitigate the potential issues with conducting evaporative emissions routines where parking conditions including vehicle compound angle and fuel level may result in particular areas of the fuel system going undiagnosed.

Turning now to FIG. 3A, a vehicle parking condition 300 is illustrated. Vehicle 305 is shown parked on an inclined surface 375. Inertial sensors 380 (e.g., 199 in FIG. 1) may enable a determination of the vehicle compound angle. For example, inertial sensors may include longitudinal 381 (X), latitudinal 383 (Y), vertical 386 (Z), roll 382, pitch 384, and yaw 386 sensors. In other words, inertial sensors may enable vehicle position information comprising six degrees of freedom. Based on the signals acquired from inertial sensors 380, it may be determined whether the vehicle compound angle may result in fuel system isolation (e.g., 218 in FIG. 2) from the emissions control system (e.g., 251 in FIG. 2), or the formation of an isolated fuel tank vapor dome(s). The determination may be based on the signals acquired from inertial sensors 380, an indicated fuel level in the fuel tank, and computer aided design (CAD) modeling of the particular fuel tank installed in vehicle 305. As one example, a 2D lookup table may be stored in the vehicle control system memory such that, for a vehicle compound angle determined from inertial sensors 380 and a fuel level it may be indicated whether the vehicle compound angle and fuel level is equal to or greater than a predetermined threshold. In other words, it may be determined whether the fuel system may be restricted from the emissions control system, and/or whether one or more section(s) of the fuel tank may be isolated from other sections of the fuel tank (e.g., isolated vapor dome formation).

Turning to FIG. 3B, an example illustration is shown depicting a situation where a vehicle parking condition is resulting in the fuel system 218 being isolated from the emission control system. Components that are the same as those illustrated in FIG. 2 are denoted by the same reference number. Illustrated in FIG. 3B, fuel system 218 is depicted as being inclined at the same vehicle compound angle as vehicle 305 illustrated in FIG. 3A. The fuel level 277 in the fuel tank 220 is such that, at the indicated fuel tank position, FLVV 285 and GVV 283 are unintentionally closed (also referred to as corking). As such, if an evaporative emissions test diagnostic were conducted, the fuel tank would be restricted from the analysis. As described above, with regard to FIG. 3A, based on signals acquired from inertial sensors 380, along with indicated fuel level 277, it may be predicted that FLVV 285 and GVV 283 are likely to be unintentionally closed under the given parking conditions. As such, prior to conducting an evaporative emissions test, mitigating actions may first be taken, as described below.

Turning to FIG. 3C, an example illustration is shown depicting a vehicle 305 under parking conditions as described in FIG. 3A, but wherein the vehicle's active suspension is employed to level the vehicle by a determined amount. Components that are the same as those illustrated in FIG. 3A are denoted by the same reference number. More specifically, vehicle 305 is shown parked on an inclined surface 375. Based on the signals acquired from inertial sensors 380 (vehicle compound angle), combined with indicated fuel level, it may be determined that the vehicle parking condition is resulting in restriction of the fuel system and/or resulting in an isolated fuel tank vapor dome(s). As such, evaporative emissions testing may not proceed until mitigating action is undertaken. Mitigating action may include determining an amount of leveling of the vehicle that may be required to level the fuel in the fuel tank such that the fuel system is no longer restricted from the emissions control system. In other words, the mitigating action may include calculating the determined amount of leveling based on the vehicle compound angle and the fuel level, and leveling the vehicle until the fuel tank valve(s) are open and/or no section of the fuel tank is isolated from another section of the fuel tank (e.g. no isolated vapor dome(s)). As described in FIG. 3A, the determination may be based on the signals acquired from inertial sensors 380, an indicated fuel level in the fuel tank, and computer aided design (CAD) modeling of the particular fuel tank installed in vehicle 305. For example, a 2D lookup table may be stored in the vehicle control system memory such that, for an indicated vehicle compound angle determined from inertial sensors 380, and an indicated fuel level, an amount of leveling may be indicated such that the fuel tank is no longer restricted from the emissions control system. As indicated in FIG. 3C, a determined leveling amount of the vehicle, indicated by arrow 376, may be accomplished via the employment of the vehicle's active suspension, such as active suspension 111 described in FIG. 1.

Turning now to FIG. 3D, an example illustration is shown depicting a situation where a vehicle leveling event resulting in the fuel system 218 being no longer restricted from the emission control system and/or the elimination of an isolated fuel tank vapor dome. Components that are the same as those illustrated in FIG. 2 (and FIG. 3B) are denoted by the same reference number. Illustrated in FIG. 3D, fuel system 218 is depicted as being leveled by the same amount as the vehicle 305 illustrated in FIG. 3C. Subsequent to the fuel tank leveling event, the fuel level 277 in the fuel tank 220 is such that, FLVV 285 and GVV 283 are no longer corked shut. As such, an evaporative emissions test may proceed.

Turning to FIG. 4, a flow chart for an example method 400 for leveling a vehicle a determined amount prior to conducting an evaporative emissions test is shown. More specifically, method 400 may be used to indicate whether a vehicle parking condition is likely to result in unintentional closing of fuel tank valves, such as FLVV (e.g., 285) and GLVV (e.g., 283) such that the fuel system is restricted from the emissions control system and/or whether isolated vapor dome(s) may be formed in the fuel tank resulting from the vehicle parking condition. The indication that the fuel tank may be restricted from the emissions control, or that isolated vapor dome(s) may be formed may be based on on-board inertial sensors, combined with an indicated level of fuel in the fuel tank. If a vehicle parking condition based on a vehicle compound angle and a fuel level is predicted to result in the fuel tank being restricted from the emissions control system, or if the formation of fuel tank vapor domes are predicted, method 400 includes leveling the vehicle a determined amount via the employment of the vehicle's active suspension system, prior to conducting an evaporative emissions test. Subsequent to the completion of the evaporative emissions test, the vehicle's active suspension system may be further employed to return the vehicle to a default state. In this way, method 400 may enable the conduction of evaporative emissions tests under conditions where no areas of the emissions control system and the fuel system go unchecked and thus violation of regulatory requirements may be reduced. Further, method 400 may increase opportunities for evaporative emission testing and thus result in a reduction in bleed emissions. Method 400 will be described with reference to the systems described herein and shown in FIGS. 1-3, though it should be understood that similar methods may be applied to other systems without departing from the scope of this disclosure. Method 400 may be carried out by a controller holding executable instructions in non-transitory memory, such as controller 12 in FIG. 2.

Method 400 begins at 402 and includes evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. At 404, method 400 includes determining whether a vehicle-off event has occurred. The vehicle-off event may include an engine-off event, and may be indicated by other events, such as a key-off event. The vehicle-off event may follow a vehicle run time duration, the vehicle run time duration commencing at a previous vehicle-on event. If no vehicle-off event is detected, method 400 proceeds to 406. At 406, method 400 includes recording that an evaporative emissions test was not executed, and may further include setting a flag to retry the evaporative emissions test at the next detected vehicle-off event. Method 400 then ends.

If a vehicle-off event is detected, method 400 may proceed to 408. At 408, method 400 may include determining whether entry conditions for an evaporative emissions test are met. Entry conditions for the evaporative emissions detection routine may include a variety of engine and/or fuel system operating conditions and parameters. Additionally, in the case when the engine is included in a hybrid electric vehicle, entry conditions for evaporative emissions detection may include a variety of vehicle conditions. For example, entry conditions for evaporative emissions detection may include an amount of time since a prior evaporative emissions testing. For example, evaporative emissions testing may be performed on a set schedule, e.g., evaporative emissions detection may be performed after a vehicle has traveled a predetermined number of miles since a previous evaporative emissions test or after a predetermined duration has passed since a previous evaporative emissions test.

As another example, entry conditions for evaporative emissions detection may include a temperature of one or more fuel system components being in a predetermined temperature range. For example, temperatures which are too hot or too cold may decrease accuracy of evaporative emissions detection. Such a temperature range may depend on the method used to calculate the evaporative emissions detection and the sensors employed. However, in some examples, evaporative emissions detection may occur at any temperature.

As another example, entry conditions for evaporative emissions detection may include whether or not undesired evaporative emissions has previously been detected. For example, if undesired evaporative emissions was detected by a prior evaporative emissions test, then evaporative emissions testing may not be performed, e.g., until the undesired evaporative emissions is fixed and an onboard diagnostic system code has been reset. Alternatively, if undesired evaporative emissions was detected by a prior evaporative emissions test, evaporative emissions testing may be repeated after a predetermined time or distance traveled to validate or invalidate the presence of undesired evaporative emissions. As another example, entry conditions for evaporative emissions detection may include if a refueling event is taking place. For example, evaporative emissions detection may not be performed while the fuel tank is being refilled or when the fuel cap is off, etc.

As another example, entry conditions for evaporative emissions detection may include an amount of available energy stored, e.g., in an energy storage device, to run a vacuum or positive pressure pump. Thus, it may be confirmed if the state of charge, voltage, etc. of the battery is such that sufficient energy is available to perform the evaporative emissions test.

For an engine-off natural vacuum test, the engine must be at rest with all cylinders off, as opposed to engine operation with the engine rotating, even if one or more cylinders are deactivated. Further entry conditions may include a threshold amount of time passed since the previous EONV test, a threshold length of engine run time prior to the engine-off event, a threshold amount of fuel in the fuel tank, and a threshold battery state of charge. For example, entry into an EONV test may be based on an amount of heat rejected by the engine during the previous drive cycle, the timing of the heat rejected, the length of time spent at differing levels of drive aggressiveness, ambient conditions, etc. The heat rejected by the engine may be inferred based on or more of engine load, fuel injected summed over time, intake manifold air mass summed over time, miles driven, etc. Further, entry conditions may be based on an ambient temperature and a fuel level. The ambient temperature may be estimated, inferred, and/or measured via an ambient temperature sensor, retrieved from an off-board weather server, etc. Fuel level may be determined by a fuel level sensor, located in the fuel tank, and may comprise a float connected to a variable resistor, such as fuel level sensor 234 depicted in FIG. 2. Alternatively, other types of fuel level sensors may be used.

As another example, entry conditions for evaporative emissions detection may include an indication that the vehicle is not occupied. For example, the indication that the vehicle is not occupied may include one or more of a powertrain control module query of seat load cells (e.g., 103 in FIG. 1), door sensing technology (e.g., 104 in FIG. 1), onboard cameras (e.g., 105 in FIG. 1), etc. In some examples, commencing the evaporative emissions test may be subsequent to an indication that the vehicle is not occupied.

If at 408 entry conditions as described above are not met, method 400 may proceed to 406. At 406, method 400 may include recording that an evaporative emissions test was not executed, and may further include setting a flag to retry the evaporative emissions test at the next detected vehicle-off event. Method 400 may then end.

If entry conditions for an evaporative emissions test are met at 408, method 400 may proceed to 410. At 410, method 400 may include calculating a vehicle compound angle (also referred to as a vehicle pitch and bank) and a fuel level. As described above, inertial sensors (e.g., 199 in FIG. 1) may enable a determination of the vehicle compound angle. For example, as described with regard to FIG. 3, inertial sensors may include longitudinal 381 (X), latitudinal 383 (Y), vertical 386 (Z), roll 382, pitch 384, and yaw 386 sensors. As such, vehicle compound angle, may be calculated at 410. Further, fuel level may be indicated at 410 via input from a fuel level sensor (e.g., fuel level sensor 234 in FIG. 2).

Following calculation of the vehicle compound angle and fuel level, method 400 may proceed to 411. At 411, method 400 includes determining whether the vehicle parking condition may result in fuel system isolation (e.g., 218 in FIG. 2) from the emissions control system (e.g., 251 in FIG. 2), or the formation of one or more isolated fuel tank vapor dome(s). As described above with regard to FIG. 3A, the determination may be based on the signals acquired from inertial sensors 380, an indicated fuel level in the fuel tank, and computer aided design (CAD) modeling of the particular fuel tank installed in the vehicle. As such, a 2D lookup table may be stored in the vehicle control system memory wherein an indicated vehicle compound angle determined at 410, may be compared to an indicated fuel level, and if the compound angle and fuel level is equal to or greater than a predetermined threshold, it may be indicated that the fuel system may be restricted from the emissions control system, and/or isolated fuel tank vapor dome(s) may result (e.g., one or more sections of the fuel tank may be isolated from other sections of the fuel tank).

If at 411 if it is indicated that fuel system isolation is not likely to occur based on the vehicle compound angle and indicated fuel level, method 400 may proceed to 412. At 412, method 400 may include conducting an evaporative emissions test without any mitigating action. For example, at 411 it may be indicated that the vehicle is parked on a steep and banked slope, but that the fuel level in the fuel tank is such that no fuel system isolation may result. In other examples, at 411 it may be indicated that the vehicle is parked on a flat surface, thus even though fuel level may be high, no fuel system isolation may result. As such, at 412, conducting an evaporative emissions test may proceed with no mitigating action. At 412, a vehicle-off evaporative emissions test may be conducted in any manner conventionally known in the art. In one example an engine-off natural vacuum emissions test may be conducted. As such, method 412 may include closing a CVV (e.g., 297 in FIG. 2), and opening an FTIV (e.g., 252 in FIG. 2) in order to couple the fuel system (e.g., 218 in FIG. 2) with the emissions control system (e.g., 251 in FIG. 2), wherein the coupled fuel system and emissions control system may be sealed from atmosphere. Subsequent to isolating the fuel system and emissions control system from atmosphere, a pressure build may be monitored for a duration. For example, if sufficient heat was rejected to the fuel tank during the previous drive cycle, pressure in the fuel system and emissions control system may increase as liquid fuel vaporizes. If the pressure builds to a predetermined threshold level, the evaporative emissions test may pass on the pressure build. Alternatively, if the pressure builds to a level below a predetermined threshold level, and plateaus, the CVV may be opened to allow for the pressure in the fuel system and emissions control system to return to atmospheric pressure. Following the return to atmospheric pressure, the CVV may again be closed to seal the emissions control system and fuel system, and the development of vacuum build may be monitored for a duration as a result of the cooling of the fuel tank. Development of a fuel system and/or emissions control system vacuum equal to or greater than a predetermined threshold vacuum level may indicate a passing result. However, if the level of vacuum does not build to a threshold level, undesired emissions may be indicated.

As an alternative to the above-described EONV evaporative emissions test, at 412 an evaporative emissions test may instead be conducted via the use of a pump configured to evacuate and/or pressurize the fuel system and emissions control system. For example, at 412, the emissions control system may be coupled to the fuel system via the opening of the FTIV, and the coupled emissions control system and fuel system sealed from atmosphere via the closing of the CVV. Subsequently, a pump (e.g., 295 in FIG. 2) may be used to pressurize the coupled fuel system and emissions control system to a predetermined level. Following the pressurization of the fuel system and emissions control system, pressure may be monitored for a duration. If the system is free of undesired evaporative emissions, the pressure level may not decline past a predetermined threshold level. Alternatively, if undesired evaporative emissions are indicated, the pressure level may decline past the predetermined threshold. In other examples, the coupled fuel system and emissions control system may be evacuated until a predetermined vacuum level is reached. Following the attainment of a predetermined vacuum level, the coupled fuel system and emissions control system may be sealed from atmosphere, and pressure monitored for a duration. If the vacuum does not decline past a predetermined threshold, then it may be indicated that undesired evaporative emissions are not present. Alternatively, if the level of vacuum declines past the predetermined threshold level, undesired evaporative emissions may be indicated.

It may be understood that the above description of EONV evaporative emissions test procedures, along with the above description of evaporative emissions test procedures using an external pressure and/or vacuum source, may be conducted in any such fashion as is conventionally known in the art. In other words, the above descriptions of example evaporative emissions test procedures are meant to be informative, and not limiting in any way.

As such, at 412, method 400 includes conducting an evaporative emissions test procedure by any manner as is conventionally known in the art. However, although entry conditions may be met at the initiation of method 400 conditions may change during the execution of the method. For example, for an emissions test being conducted without leveling, a vehicle becoming occupied, an engine restart, or a refueling event may be sufficient to abort the method at any point prior to completing method 400. As such, if such events are detected at 413 that would interfere with the performing of method 400 or the interpretation of results derived from executing method 400, method 400 may proceed to 414 and abort the test, record that an evaporative emissions test was aborted, and proceed to 406 in order to set a flag to retry the evaporative emissions test at the next detected vehicle-off event, and then end.

If a vehicle becoming occupied (or a refueling event, etc.) is not detected during the conducting of the evaporative emissions test, method 400 proceeds to 415 and includes recording the results of the test. For example, recording the outcome of the test may include recording a passing result of the evaporative emissions test at the controller, or recording a failing result of the evaporative emissions test at the controller. Responsive to a failing result of the evaporative emissions test, at 412, recording the result may include setting a flag at the controller and activating an MIL to indicate the vehicle operator of the presence of undesired evaporative emissions.

Subsequent to the conducting of an evaporative emissions test procedure at 412 and recording the result at the controller, method 400 may proceed to 416. At 416, method 400 may include updating an evaporative emissions system and fuel system status to reflect the passing or failing result of the evaporative emissions test. For example, responsive to a passing result from an evaporative emissions test wherein undesired emissions are not indicated, updating emissions control system and fuel system status may include updating the evaporative emissions test schedule. For example, scheduled evaporative emissions tests may be delayed or adjusted based on the passing test result. Alternatively, responsive to a failing evaporative emissions test result at 412, updating emissions control system and fuel system status may include adjusting engine operating parameters to reflect an indication of undesired emissions in the fuel system and/or emissions control system. For example, adjusting engine operating parameters may include adjusting a maximum engine load to reduce fuel consumption, adjusting a commanded A/F ratio, operating the vehicle in battery-only mode during certain conditions, etc. Method 400 may then end.

Returning to 411, if it is indicated that fuel system isolation may occur based on the indicated vehicle compound angle, along with an indicated fuel level, method 400 may proceed to 418. At 418, method 400 may include calculating a corrective leveling amount wherein by leveling the vehicle by the calculated amount, fuel system isolation may be mitigated. As described above with regard to FIG. 3C, a corrective leveling amount may be determined based on the signals acquired from inertial sensors 380, an indicated fuel level in the fuel tank, and computer aided design (CAD) modeling of the particular fuel tank installed in vehicle 305. For example, a 2D lookup table may be stored in the vehicle control system memory such that, for an indicated vehicle compound angle determined from inertial sensors 380, and an indicated fuel level, an amount of leveling may be indicated such that the fuel tank is no longer restricted from the emissions control system. In other words, calculating the corrective leveling amount at 418 may include calculating the amount based on the vehicle compound angle and the fuel level where the indicated leveling may result in the one or more fuel tank valve(s) being open and/or where no section of the fuel tank is isolated from another section of the fuel tank.

Proceeding to 420, method 400 may include indicating whether the leveling amount indicated at 418 is greater than a predetermined threshold. For example, the amount of leveling required to correct the fuel system isolation must be within the capacity of the vehicle active suspension system. If at 420 it is determined that the indicated amount of vehicle leveling in order to correct the fuel tank isolation exceeds the capabilities of the vehicle active suspension system, method 400 may proceed to 422. At 422, method 400 may include recording that an evaporative emissions test was not executed, and may further include setting a flag to retry the evaporative emissions test at the next detected vehicle-off event. Method 400 may then end.

Returning to 420, if it is determined that the leveling amount required to correct the fuel tank isolation does not exceed the capabilities of the vehicle active suspension system, method 400 may proceed to 424. At 424, method 400 may include leveling the vehicle the amount determined amount at 418. For example, at 424, the vehicle's active suspension system (e.g., 111 in FIG. 1) may be employed to level the vehicle in accordance with an indicated corrective amount according to the vehicle compound angle and fuel level. As described above with regard to FIG. 1, active suspension system 111 may comprise an active suspension system having hydraulic, electrical, and/or mechanical devices, as well as active suspension systems that control the vehicle height on an individual corner basis (e.g., four corner independently controlled vehicle heights), and/or on an axle-by-axle basis (e.g., front axle and rear axle vehicle heights), etc.

Subsequent to leveling the vehicle at 424, method 400 may proceed to 426. At 426, method 400 may include conducting an evaporative emissions test procedure. At 426, a vehicle-off evaporative emissions test may be conducted in any manner conventionally known in the art. In one example an engine-off natural vacuum emissions test may be conducted, as described above in detail with regard to step 412 of method 400. In another example, as an alternative to the above-described EONV evaporative emissions test, at 426 an evaporative emissions test may instead be conducted via the use of a pump configured to evacuate and/or pressurize the fuel system and emissions control system, as described above in detail with regard to step 412 of method 400. It may be understood that the above description of EONV evaporative emissions test procedures, along with the above description of evaporative emissions test procedures using an external pressure and/or vacuum source, may be conducted at step 426 of method 400 in any such fashion as is conventionally known in the art. In other words, the above descriptions of example evaporative emissions test procedures are meant to be informative, and not limiting in any way.

As such, at 426, method 400 includes conducting an evaporative emissions test procedure by any manner as is conventionally known in the art. However, as described above, although entry conditions may be met at the initiation of method 400 conditions may change during the execution of the method. For example, for an emissions test being conducted subsequent to leveling, a vehicle becoming occupied, an engine restart, or a refueling event may be sufficient to abort the method at any point prior to completing method 400. As such, if such events are detected at 428 that would interfere with the performing of method 400 or the interpretation of results derived from executing method 400, method 400 may proceed to 430 and abort the test, record that an evaporative emissions test was aborted, return the vehicle to default conditions prior to the commencing of the evaporative emissions test, and proceed to 422 in order to set a flag to retry the evaporative emissions test at the next detected vehicle-off event, and then end.

If a vehicle becoming occupied (or a refueling event, etc.) is not detected during the conducting of the evaporative emissions test, method 400 proceeds to 431 and includes recording the results of the test. For example, recording the outcome of the test may include recording a passing result of the evaporative emissions test at the controller, or recording a failing result of the evaporative emissions test at the controller. Responsive to a failing result of the evaporative emissions test, at 426, recording the result may include setting a flag at the controller and activating an MIL to indicate the vehicle operator of the presence of undesired evaporative emissions.

Proceeding to 432, method 400 includes returning the vehicle to default parking conditions subsequent to completion of the evaporative emissions test procedure. For example, at 432, returning the vehicle to default conditions may include employing the vehicle's active suspension system (e.g., 111 in FIG. 1) to return the vehicle to default (also referred to herein as pre-leveling) conditions. However, in other examples, method 400 may include not returning the vehicle to default parking conditions subsequent to completion of the evaporative emissions test procedure. For example, subsequent to completion of the evaporative emissions test procedure, the vehicle may be maintained at the level for which the vehicle was maintained during the evaporative emission test.

Following returning the vehicle to pre-leveling conditions at 432, method 400 may proceed to 416. At 416, method 400 may include updating emission control system and fuel system status. At 416, method 400 may include updating an evaporative emissions system and fuel system status to reflect the passing or failing result of the evaporative emissions test. For example, responsive to a passing result from an evaporative emissions test wherein undesired emissions are not indicated, updating emissions control system and fuel system status may include updating the evaporative emissions test schedule. For example, scheduled evaporative emissions tests may be delayed or adjusted based on the passing test result. Alternatively, responsive to a failing evaporative emissions test result at 431, updating emissions control system and fuel system status may include adjusting engine operating parameters to reflect an indication of undesired emissions in the fuel system and/or emissions control system. For example, adjusting engine operating parameters may include adjusting a maximum engine load to reduce fuel consumption, adjusting a commanded A/F ratio, operating the vehicle in battery-only mode during certain conditions, etc. Method 400 may then end.

In some examples, certain parameters of the evaporative emissions test detailed in method 400 may change depending on whether the evaporative emissions test is conducted without leveling the vehicle, as compared to the evaporative emissions test conducted via leveling of the vehicle. In other words, certain parameters of the evaporative emissions test may be different if conducted at 412 of method 400 compared to 426 of method 400. In one example, leveling of the vehicle at 426 may result in significant sloshing of the fuel in the fuel tank. As such, for an EONV evaporative emissions test, the passing threshold for the pressure build portion and/or vacuum build portion of the EONV test may be adjusted to account for the increased pressure in the fuel tank generated by the sloshing of fuel resulting from leveling the vehicle at 424. In some cases the adjusted threshold may be an absolute threshold. In other cases the adjusted threshold may comprise an adjusted threshold rate. In other examples, such as an evaporative emissions test conducted via the external pressurization and/or evacuation of the fuel system and emissions control system, certain parameters of the evaporative emissions test may similarly be different if conducted at 412 of method 400 compared to 426 of method 400. For example, as described above, the act of leveling the vehicle at 424 of method 400 may result in significant sloshing of fuel in the fuel tank. As such, the increased level of pressure in the fuel system and/or emissions control system may affect the results of a pressure or vacuum-based evaporative emissions test conducted via an external source. Therefore, in one example, prior to conducting an evaporative emissions test at 426 subsequent to leveling the vehicle, the pressure in the fuel system and/or emissions control system may first need to be stabilized prior to conducting the evaporative emissions test. In one example, the period of time for stabilization may be greater for conducting an evaporative emissions test at 426 than a period of time for stabilization for conducting an evaporative emissions test at 412.

The above examples of parameters that may change as a result of the evaporative emissions test detailed in method 400 being conducted without leveling the vehicle, as compared to the evaporative emissions test conducted via leveling of the vehicle are meant to be illustrative and not limiting in any way. For example, any number of parameters may change accordingly based on vehicle compound angle and fuel level, in conjunction with the presence or absence of leveling of the vehicle prior to conducting the evaporative emissions test.

FIG. 5 shows an example timeline 500 for determining whether a vehicle parking condition may result in fuel system isolation, and if so, leveling the vehicle a determined amount prior to conducting an evaporative emissions test procedure according to the methods described herein and with reference to FIG. 4, and as applied to the systems described herein and with reference to FIGS. 1-3. Timeline 500 includes plot 505, indicating whether a vehicle-off event is detected over time, and plot 510, indicating a fuel tank fuel level over time. Timeline 500 further includes plot 515, indicating a percent road grade (e.g., road compound angle) over time, and plot 520, indicating a vehicle grade (e.g., vehicle compound angle), over time. Line 525 represents a first threshold where above the threshold fuel tank isolation may result, the threshold based on the vehicle parking condition (e.g., vehicle compound angle or vehicle pitch angle and bank angle), and fuel level, indicated by plot 510. Line 530 represents a second threshold where above the threshold fuel tank isolation may result, the threshold similarly based on the on the vehicle parking condition (e.g., vehicle compound angle or vehicle pitch angle and bank angle), and fuel level. Timeline 500 further includes plot 535, indicating the status of a canister vent valve (CVV), over time. Timeline 500 further includes plot 540, indicating a pressure monitored by a fuel tank pressure transducer (FTPT), such as FTPT 291 in FIG. 2. Line 545 represents a predetermined threshold pressure, below which undesired emissions may be indicated during an EONV evaporative emissions test procedure. Line 550 represents a predetermined vacuum threshold, above which undesired emissions may be indicated during an EONV evaporative emission test procedure. While timeline 500 indicates an evaporative emissions test comprising an EONV test procedure, it should be understood that any suitable evaporative emissions test procedure may be employed without departing from the scope of this disclosure. Timeline 500 further includes plot 555, indicating whether undesired emissions are indicated, over time.

At time $t_0$ the vehicle is in operation, indicated by plot 505. Fuel level in the fuel tank is near full, indicated by plot 510. The vehicle is traveling along a flat road where the road grade is a defined percentage, indicated by plot 515. As such, the vehicle grade, or compound angle, indicated by plot 520 and determined by inertial sensors (e.g., 199 in FIG. 1), is indicated to be the same percentage grade as the road grade percentage. As the vehicle is in operation, the CVV is open, indicated by plot 535. As such, pressure in the emissions control system and fuel system, as monitored by FTPT, is at atmosphere. In some examples, as described above with regard to method 400, a vehicle may be configured with a FTIV, such as FTIV 252 (FIG. 1). In such a case, control over the coupling between the fuel system and the emission control system may be enabled. However, in this example, the FTIV is excluded as not all vehicles may be configured with and FTIV. As such, in this example timeline 500, the fuel system may be considered coupled to the emissions control system. As such, by opening the CVV, as described, FTPT indicates atmospheric pressure. Further, at time to, undesired emissions are not indicated, indicated by plot 555.

Between time $t_0$ and $t_1$ the vehicle remains in operation, and ascends a hill, indicated by plot 515. As such, inertial sensors indicate the vehicle is traveling up a hill, indicated by plot 520. As the vehicle is in operation, fuel level slightly declines.

At time $t_1$ a vehicle-off event is detected, indicated by plot 505. As the vehicle-off event has occurred at a defined percentage, inertial sensors indicate that the vehicle is parked on an incline, indicated by plot 520. Between time $t_1$ and $t_2$ it may be determined whether the vehicle parking condition may result in fuel system isolation, or the formation of isolated vapor dome(s). For example, as described above, inertial sensors may indicate vehicle pitch and bank (compound angle), or vehicle grade. In the example timeline 500, for illustration purposes, it is assumed that the vehicle is parked on a hill wherein vehicle bank is negligible and thus not included in the discussion. However, in some examples vehicle bank may be significant. Upon determining the vehicle grade (compound angle), a fuel level may be determined, and as described above, a 2D lookup table may be stored in the vehicle control system memory wherein an indicated vehicle compound angle, may be compared to an indicated fuel level, and if the fuel level and vehicle compound angle (e.g., vehicle grade) is equal to or greater than a predetermined threshold, it may be indicated that the fuel system may be restricted from the emissions control system, and/or isolated fuel tank vapor dome(s) may result. As the fuel level is quite high, indicated by plot 510, between time $t_1$ and $t_2$ it may be determined that the fuel system may be isolated from the emission control system. Accordingly, between time $t_1$ and $t_2$ it may be determined the amount of vehicle leveling that may be required in order to mitigate the isolation of the fuel system from the emission control system, and/or to mitigate the formation of fuel tank vapor dome(s). As described above, the determination may be similarly based on the signals acquired from inertial sensors, the indicated fuel level in the fuel tank, and computer aided design (CAD) modeling of the particular fuel tank installed in vehicle, and may be retrievable via a 2D vehicle lookup table. As indicated, line 525 represents a first threshold vehicle grade (compound angle) for which fuel system isolation, and/or the formation of isolated fuel tank vapor dome(s) are no longer indicated. Following the determination of the amount of leveling required, it may further be determined whether the amount of corrective leveling is greater than a maximum amount of leveling possible by the vehicle's active suspension system. In this example timeline 500, the amount of corrective leveling is assumed to not exceed the maximum amount of leveling possible. As such, between time $t_2$ and $t_3$ the vehicle's active suspension system is employed in order to level the vehicle the determined amount, as indicated by plot 520.

As the corrective leveling of the vehicle via the vehicle's active suspension system may cause fuel sloshing in the fuel tank, subsequent to the leveling of the vehicle the determined amount, the vehicle system may be allowed to stabilize for a predetermined period of time prior to execution of an evaporative emissions test. As such, between time $t_3$ and $t_4$ the CVV, indicated by plot 535, is maintained open to allow fuel system stabilization.

At time $t_4$ the CVV may be commanded closed. As such, the fuel system and emissions control system may be isolated from atmosphere. Accordingly, pressure may build in the fuel system and emissions control system, indicated by plot 540, and as measured by the FTPT. Between time $t_4$ and $t_5$ pressure in the fuel system and emissions control system builds, but does not reach a threshold pressure build, indicated by line 545. Instead, the pressure build is observed to plateau. As such, the fuel system and emission control system did not pass the evaporative emissions test on a pressure build, but may instead pass on a vacuum build, as described below. Thus, at time $t_5$ the CVV is commanded open, and between time $t_5$ and $t_6$ pressure in the fuel system and emissions control system returns to atmospheric pressure.

At time $t_6$ the CVV is commanded closed, and pressure in the fuel system and emissions control system is monitored for a duration of time. As the fuel tank cools, vacuum is observed to develop in the fuel tank, and at time $t_7$ the vacuum build reaches a threshold vacuum level, represented by line 550. As such, the fuel system and emission control system may be indicated to pass the evaporative emissions test, and thus undesired emissions are not indicated, as indicated by plot 555.

As the evaporative emissions test procedure is complete at time $t_7$, CVV may be commanded open. Accordingly, between time $t_7$ and $t_8$ pressure in the fuel system and emissions control system return to atmospheric pressure. Further, between time $t_7$ and $t_8$ the vehicle's active suspension system may be employed in order to return the vehicle to the default state, or in other words to return the vehicle to the pre-leveling conditions, as indicated by plot 520.

At time $t_8$ a vehicle-on event is detected. Between time $t_8$ and $t_9$ the vehicle is observed to travel down a hill, indicated by plot 515, wherein the vehicle grade (compound angle) may be indicated by inertial sensors, as illustrated by plot 520. At time $t_9$ the vehicle begins travelling along a flat surface, and between time $t_9$ and $t_{10}$ no changes in road grade, and thus no changes in vehicle grade, are indicated. At time $t_{10}$ the vehicle is observed to being travel up a hill. Between time $t_{10}$ and $t_{11}$ travel up the hill is indicated, until the vehicle is observed to park on the hill at time $t_{11}$, indicated by the detection of a vehicle-off event at time $t_{11}$.

Between time $t_{11}$ and $t_{12}$ it may be determined whether the vehicle parking condition may result in fuel system isolation, or the formation of isolated vapor dome(s). For example, inertial sensors may indicate vehicle grade (compound angle). As described above, in the example timeline 500, it is assumed that the vehicle is parked on a hill wherein vehicle bank is negligible and thus not included in the discussion. However, in some examples vehicle bank may be significant. Upon determining the vehicle compound angle (e.g., vehicle grade), a fuel level may be determined, and as described above, a 2D lookup table may be utilized to determine whether the fuel system may be restricted from the emissions control system, and/or whether isolated fuel tank vapor dome(s) may be indicated. As the fuel level is still near half full, and the vehicle is parked on a steep hill, between time $t_{11}$ and $t_{12}$ it may be determined that the fuel system may be isolated from the emission control system. Accordingly, between time $t_{11}$ and $t_{12}$ the amount of leveling required to mitigate the isolation of the fuel system from the emission control system may be determined, as described above. As indicated, line 530 represents a second threshold vehicle grade for which fuel system isolation, and/or the formation of isolated fuel tank vapor dome(s) are no longer indicated. As described above, following the determination of the amount of leveling required, it may further be determined whether the amount of corrective leveling exceeds a maximum amount of leveling possible by the vehicle's active suspension system. In this example timeline 500, the amount of corrective leveling indicated between time $t_{11}$ and $t_{12}$ is assumed to exceed the maximum amount of leveling capable by employing the vehicle's active suspension system. As such, between time $t_{12}$ and $t_{13}$ the CVV is maintained open, and no corrective leveling action is undertaken, indicated by plot 520. As an evaporative emissions test procedure was not undertaken during the vehicle-off event commencing at time $t_{11}$, a flag may be set in the controller to retry an evaporative emissions test at the next vehicle-off event.

In this way, the entire fuel system and emissions control system may be diagnosed for potential undesired emissions, even under circumstances wherein vehicle parking conditions may otherwise result in isolation of the fuel system from the emissions control system and/or result in the formation of isolate fuel tank vapor dome(s). As such, opportunities for conducting evaporative emissions tests may be advantageously increased, and potential violations of regulatory requirements for evaporative emissions testing may be reduced. Accordingly, release of undesired emissions to the atmosphere may be reduced.

The technical effect of conducting evaporative emissions testing procedures subsequent to leveling the vehicle under certain parking conditions is to indicate a vehicle pitch angle and bank angle, and in conjunction with an indicated level of fuel in the fuel tank, indicate a determined amount of corrective leveling required to mitigate fuel system isolation or the formation of isolated fuel tank vapor dome(s). By CAD modeling of the fuel tank, a lookup table may be utilized such that the vehicle may be leveled a determined amount, thus mitigating fuel system isolation issues. In this way, the amount of leveling may be minimized such that the fuel system isolation issues are mitigated without excessive or unwarranted leveling.

The systems described herein and with reference to FIGS. 1-3, along with the methods described herein and with reference to FIG. 4 may enable one or more systems and one or more methods. In one example, a method comprises, responsive to a first vehicle-off condition, maintaining a vehicle compound angle with respect to ground and conducting an evaporative emissions test; and responsive to a second vehicle-off condition, leveling a vehicle a determined amount and then conducting the evaporative emissions test. In a first example of the method, the method includes wherein maintaining the vehicle compound angle with respect to ground is based on the vehicle compound angle and a fuel level in a fuel tank below a predetermined threshold; and wherein leveling the vehicle a determined amount is based on the vehicle compound angle and the fuel level above a predetermined threshold. A second example of the method optionally includes the first example and further includes wherein the predetermined threshold is retrieved via a 2D lookup table comprising the vehicle compound angle and the fuel level. A third example of the method optionally includes one or more or each of the first and second examples and further includes wherein the first vehicle-off condition comprises the vehicle compound angle and the fuel level below the predetermined threshold such that one or more of a fuel tank valve(s) is maintained open, and where no section of the fuel tank is isolated from any other section of the fuel tank; and wherein the second vehicle-off condition comprises the vehicle compound angle and the fuel level above the predetermined threshold such that one or more of the fuel tank valve(s) are closed, and/or one or more sections of the fuel tank are isolated from another section of the fuel tank. A fourth example of the method optionally includes any one or more or each of the first through third examples and further includes wherein leveling the vehicle a determined amount includes calculating the determined amount based on the vehicle compound angle and the fuel level, and leveling the vehicle until the one or more fuel tank valve(s) are open and/or where no section of the fuel tank is isolated from another section of the fuel tank; and wherein the leveling is not executed if it is indicated that the determined leveling amount is greater than a predetermined threshold. A fifth example of the method optionally includes any one or more or each of the first through fourth examples and further includes wherein leveling the vehicle a determined amount includes leveling the vehicle via an onboard active suspension. A sixth example of the method optionally includes any one or more or each of the first through fifth examples and further includes wherein the leveling of the vehicle a determined amount is maintained for the duration of the evaporative emissions test and wherein the vehicle is returned to default conditions subsequent to completion of the evaporative emissions test. A seventh example of the method optionally includes any one or more or each of the first through sixth examples and further includes wherein the first condition includes commencing the evaporative emissions test subsequent to an indication that the vehicle is not occupied; and wherein the second condition includes commencing leveling the vehicle and conducting the evaporative emissions test subsequent to the indication that the vehicle is not occupied. An eighth example of the method optionally includes any one or more or each of the first through seventh examples and further includes wherein the indication that the vehicle is not occupied includes one or more of a powertrain control module query of seat load cells, door sensing technology, and onboard cameras. A ninth example of the method optionally includes any one or more or each of the first through eighth examples and further includes wherein the first condition includes aborting the evaporative emissions test responsive to an indication that the vehicle has become occupied during the evaporative emissions test; wherein the second condition includes aborting the evaporative emissions test and returning the vehicle to default conditions responsive to an indication that the vehicle has become occupied during the evaporative emissions test; and wherein the indication that the vehicle has become occupied during the evaporative emissions test includes one or more of a powertrain control module query of seat load cells, door sensing technology, and onboard cameras.

Another example of a method comprises responsive to a vehicle-off condition, indicating a fuel level in a fuel tank; indicating a vehicle compound angle via on-board sensors; and responsive to the fuel level and the vehicle compound angle above a predetermined threshold; leveling the vehicle a determined amount via the employment of an on-board active suspension; conducting an evaporative emissions test; and subsequent to completion of the evaporative emissions test, returning the vehicle to default conditions. In a first example of the method, the method includes wherein the predetermined threshold is based on computer aided design modeling of the fuel tank, and wherein the predetermined threshold is retrieved via a 2D lookup table comprising the vehicle compound angle and the fuel level. A second example of the method optionally includes the first example and further includes wherein responsive to the fuel level and vehicle compound angle below the predetermined threshold, conducting the evaporative emissions test without leveling of the vehicle. A third example of the method optionally includes any one or more of the first and second examples and further includes wherein the fuel level and vehicle compound angle above the predetermined threshold includes one or more of a fuel tank valve(s) being closed, and/or one or more sections of the fuel tank isolated from other sections of the fuel tank; and wherein the fuel level and vehicle compound angle below the predetermined threshold includes one or more of the fuel tank valve(s) maintained open, and/or where no section of the fuel tank is isolated from any other section of the fuel tank. A fourth example of the method optionally includes any one or more of the first through third examples and further includes wherein conducting the evaporative emissions test without leveling of the vehicle commences subsequent to an indication that the vehicle is not occupied; wherein leveling the vehicle the determined amount via the employment of an on-board active suspension and conducting the evaporative emissions test commences subsequent to the indication that the vehicle is not occupied; and wherein the indication that the vehicle is not occupied includes one or more of a powertrain control module query of seat load cells, door sensing technology, and onboard cameras. A fifth example of the method optionally includes any one or more or each of the first through fourth examples and further comprises aborting the evaporative emissions test being conducted without leveling of the vehicle upon indication that the vehicle has become occupied during the course of the evaporative emissions test; aborting the evaporative emissions test being conducted via leveling of the vehicle and returning the vehicle to default conditions upon indication that the vehicle has become occupied during the course of the evaporative emissions test; wherein the indicating includes the one or more of the powertrain control module query of seat load cells, door sensing technology, and onboard cameras.

An example of a system for a vehicle comprises a fuel system coupled to an evaporative emissions control system, the fuel system and evaporative emissions control system isolatable from atmosphere via one or more valves; a fuel tank housed within the fuel system, the fuel tank comprising one or more fuel tank vent valves; an active suspension system; a plurality of on-board inertial sensors; one or more of a seat load cell(s), a door sensing technology, and an onboard camera(s); a controller configured with instructions stored in non-transitory memory, that when executed, cause the controller to: responsive to a vehicle-off event; indicate a fuel level in the fuel tank; indicate a vehicle compound angle via the plurality of on-board inertial sensors; indicate a vehicle-occupancy via the one or more of the seat load cells, the door sensing technology, and the onboard camera(s); and responsive to the fuel level and vehicle compound angle above a predetermined threshold and an indication that the vehicle is not occupied; level the vehicle a determined amount via employing the active suspension system; isolate the fuel system and evaporative emissions control system; conduct an evaporative emissions test procedure; and subsequent to the completion of the evaporative emissions test procedure; return the vehicle to a default state via employing the active suspension system. In a first example, the system further includes wherein the predetermined threshold is based on the fuel level and the vehicle compound angle where one or more of a fuel tank valve(s) is closed and/or one or more sections of the fuel tank are isolated from other sections of the fuel tank, and where the controller is configured with instructions stored in non-transitory memory, that when executed, cause the controller to: calculate the determined amount of leveling wherein subsequent to leveling the vehicle the determined amount, the fuel level and vehicle compound angle is below the predetermined threshold where the one or more fuel tank valve(s) are open and/or no section(s) of the fuel tank are isolated from other section(s) of the fuel tank. A second example of the system optionally include the first example and further includes wherein the controller is configured with instructions stored in non-transitory memory, that when executed, cause the controller to: responsive to the fuel level and vehicle compound angle below a predetermined threshold and the indication that the vehicle is not occupied; execute the evaporative emissions test procedure without leveling of the vehicle; and responsive to an indication that the vehicle has become occupied during the course of the evaporative emissions test, in a first condition, abort the evaporative emissions test responsive to the test being conducted without leveling of the vehicle; and in a second condition, abort the evaporative emissions test responsive to the test being conducted via leveling of the vehicle and returning the vehicle to default conditions. A third example of the system optionally includes any one or more or each of the first and second examples and further includes wherein the controller is configured with instructions stored in non-transitory memory, that when executed, cause the controller to: responsive to the fuel level and vehicle compound angle above a predetermined threshold; indicate the determined leveling amount; indicate a maximum leveling capacity of the vehicle; and responsive to the determined leveling amount greater than the maximum leveling capacity; do not conduct leveling and do not conduct the evaporative emissions test procedure.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle executable by an electronic controller, comprising:
determining, via the electronic controller, that the vehicle has entered a first vehicle-off condition that includes the vehicle being at a first determined vehicle compound angle determined via on-board sensors and a fuel tank of the vehicle having a first fuel level determined via a fuel level sensor, and in response, conducting, via instructions executed by the electronic controller, an evaporative emissions test without leveling the vehicle, the first determined vehicle compound angle including a summation of a first determined vehicle pitch angle and a first determined vehicle bank angle; and
determining that the vehicle has entered a second vehicle-off condition that includes the vehicle being at a second determined vehicle compound angle and the fuel tank of the vehicle having a second fuel level, and in response, leveling, via instructions executed by the electronic controller, the vehicle a determined amount and then conducting the evaporative emissions test, wherein leveling the vehicle the determined amount includes adjusting, via the electronic controller, an onboard active suspension to change the second determined vehicle compound angle, the second determined vehicle compound angle including a summation of a second determined vehicle pitch angle and a second determined vehicle bank angle.

2. The method of claim 1, wherein leveling the vehicle the determined amount is based on the determined amount being above a predetermined threshold, the determined amount determined based on the second vehicle compound angle and the second fuel level.

3. The method of claim 2, wherein the determined amount is retrieved via a 2D lookup table based on the second vehicle compound angle and the second fuel level, and wherein during the first vehicle-off condition, the vehicle is not leveled in response to determining that a second determined amount is below the predetermined threshold, the second determined amount retrieved via the 2D lookup table based on the first vehicle compound angle and the first fuel level.

4. The method of claim 2, wherein the first vehicle compound angle and the first fuel level prevents fuel from isolating one or more fuel tank valves and one or more sections of the fuel tank from any other section of the fuel tank; and
wherein the second vehicle compound angle and the second fuel level causes fuel to isolate the one or more fuel tank valves and/or one or more sections of the fuel tank from another section of the fuel tank.

5. The method of claim 2, wherein leveling the vehicle the determined amount includes leveling the vehicle until one or more fuel tank valves are no longer isolated by fuel and/or until no section of the fuel tank is isolated from another section of the fuel tank; and wherein the leveling is not executed if it is indicated that the determined amount is greater than a second predetermined threshold.

6. The method of claim 1, wherein the leveling of the vehicle the determined amount is maintained for a duration of the evaporative emissions test and wherein the vehicle is returned to default conditions subsequent to completion of the evaporative emissions test.

7. The method of claim 1, wherein the first vehicle-off condition and the second vehicle-off condition each include a determination by the electronic controller that the vehicle is not occupied.

8. The method of claim 7, further comprising determining, via the electronic controller, that the vehicle is not occupied based on one or more of a powertrain control module query of seat load cells, door sensing technology, and onboard cameras.

9. The method of claim 1, further comprising, during the first vehicle-off condition, aborting the evaporative emissions test responsive to a first determination by the electronic controller that the vehicle has become occupied during the evaporative emissions test;

during the second vehicle-off condition, aborting the evaporative emissions test and returning the vehicle to default conditions responsive to a second determination by the electronic controller that the vehicle has become occupied during the evaporative emissions test; and wherein each determination that the vehicle has become occupied during the respective evaporative emissions test is based on one or more of a powertrain control module query of seat load cells, door sensing technology, and onboard cameras.

* * * * *